Nov. 16, 1948.  W. N. ALLYN  2,453,888
OPTICAL INSTRUMENT FOR EXAMINING AND MEASURING
CHARACTERISTICS OF THE EYE
Filed July 1, 1946  2 Sheets-Sheet 1
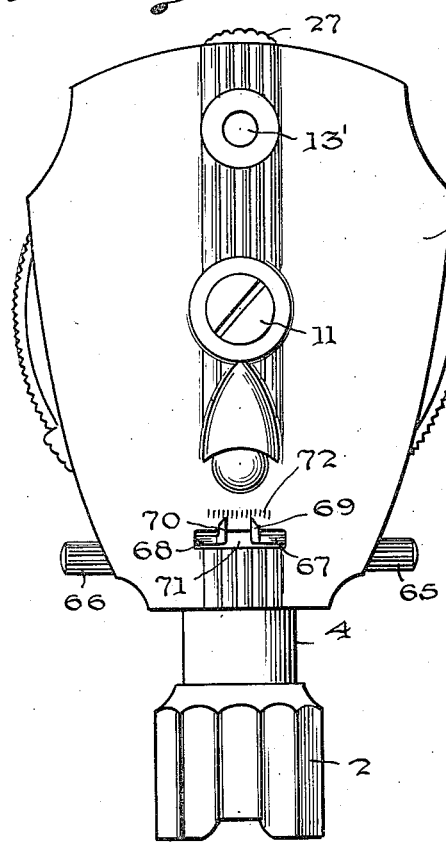
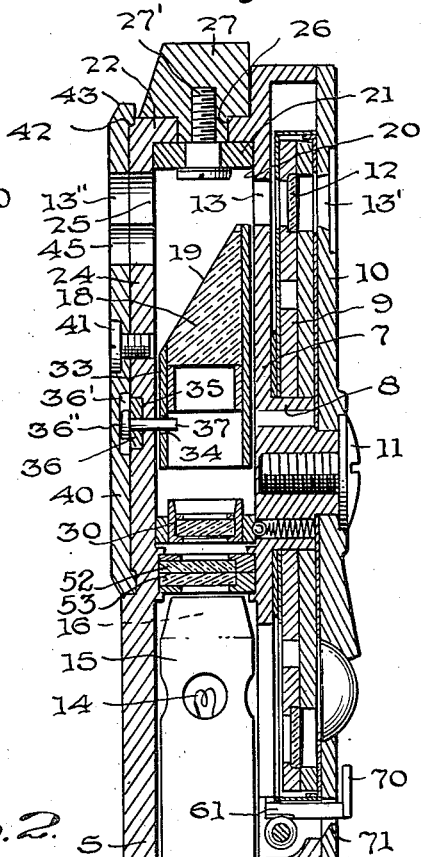
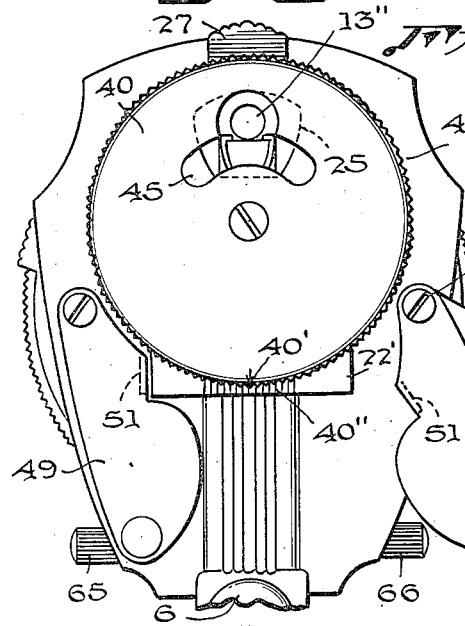
Inventor
W. N. Allyn
Robb & Robb
By Attorneys.

Nov. 16, 1948.                    W. N. ALLYN                      2,453,888
                OPTICAL INSTRUMENT FOR EXAMINING AND MEASURING
                           CHARACTERISTICS OF THE EYE
Filed July 1, 1946                                           2 Sheets-Sheet 2
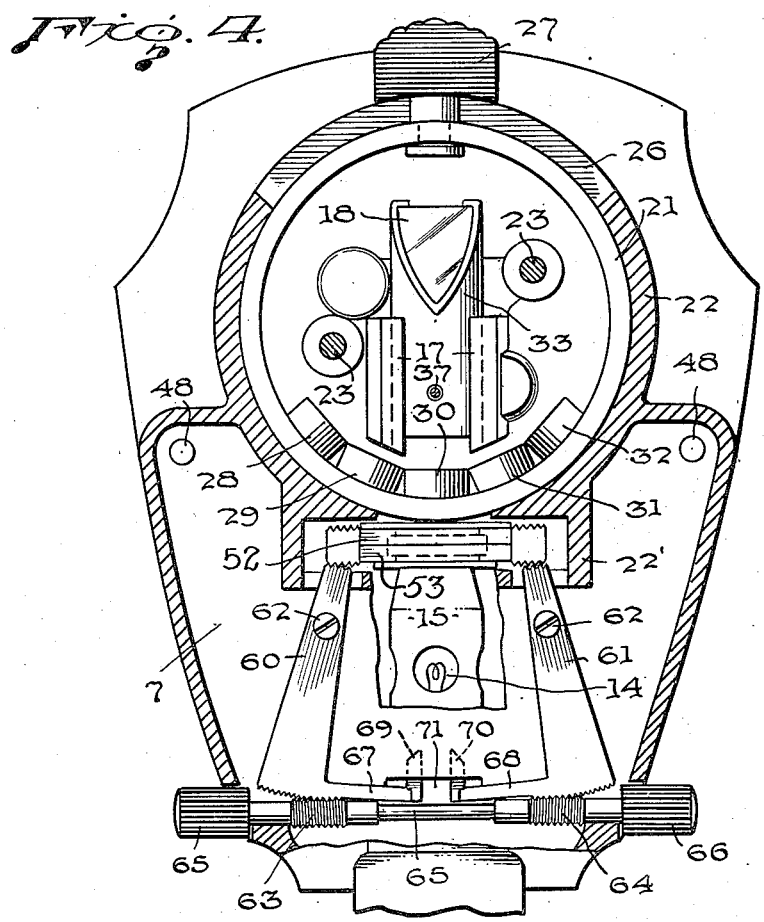
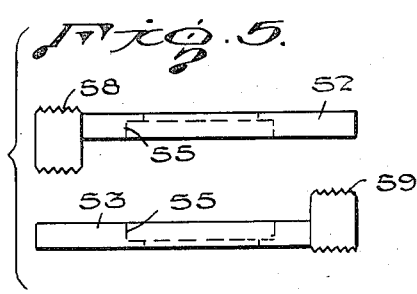
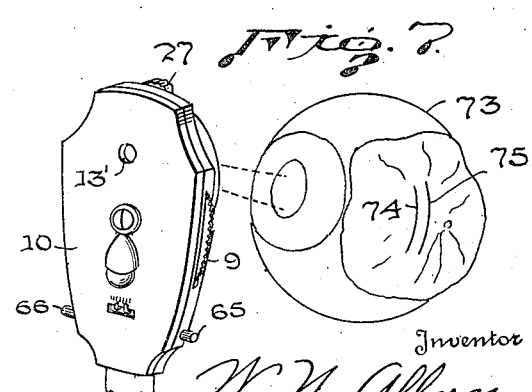
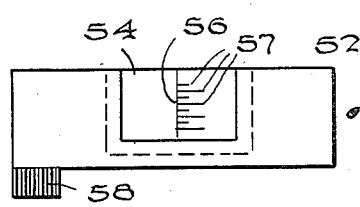

Patented Nov. 16, 1948

2,453,888

UNITED STATES PATENT OFFICE 2,453,888

OPTICAL INSTRUMENT FOR EXAMINING AND MEASURING CHARACTERISTICS OF THE EYE

William N. Allyn, Skaneateles, N. Y., assignor to Welch Allyn, Inc., Auburn, N. Y., a corporation of New York Application July 1, 1946, Serial No. 680,697

10 Claims. (Cl. 88—20)

1

The present invention relates to optical instruments, and more especially, to diagnostic instruments of the ophthalmoscope type which are primarily adapted for examining the eye microscopically under illumination.

The primary object of the invention is to provide an instrument having means for use in measuring or calibrating the retina vessels and/or other parts or conditions of the eye. While such means may be embodied in an instrument which is intended for no other purpose than the measurement or calibration above referred to, said means may form a part of or addition to optical instruments having other uses, and preferably is embodied in ophthalmoscopes of the type disclosed in my co-pending application Serial No. 581,752, filed March 9, 1945.

In carrying out the primary object of the invention, the instrument includes essentially a frame having a sight opening therethrough, a miniature electric lamp supported by the frame, a reflector preferably having the form of a prism onto which the light rays from the lamp are directed and then reflected thereby in a path relatively close and substantially parallel to the line of sight through the sight opening. The instrument may or may not be provided with a plurality of lenses which are selectively registrable with the sight opening, as in the case of conventional ophthalmoscopes.

Interposed in the light beam, preferably between the lamp and the prism is a pair of transparent slides arranged one on top of the other, each of said slides having a reference point, preferably in the form of a transversely extended line, delineated thereon so that it will cast a shadow line in the eye when the light beam is projected into the eye.

Another object of the invention is to provide means for manually adjusting the slides so that the lines, and consequently the shadow lines projected into the eye, may be varied in position relative to each other and preferably over a suitable range from a condition in which the lines register or coincide with each other, to a condition in which the lines are spaced apart in parallel relation to each other. The slides are so adjustable that the distance between the shadow lines may be varied to correspond with the measurements of the retina vessels or other features of the eye.

A further object of the invention is to provide adjustable indicator means on the instrument which will visually indicate in suitable units the measurements of the retina vessels or other features of the eye, responsive to adjustments of the

2 slides and the projected shadow lines relative to each other.

Other and further objects and advantages of the invention will be hereinafter described and the novel features thereof defined in the appended claims.

In the drawings:

Figure 1 is a view in front elevation of an optical instrument head of the ophthalmoscope type and to which the present invention has been applied as one practical embodiment thereof, the head being seen in this view from the observer's side to show the indicating means on the face thereof;

Figure 2 is a fragmentary view in rear elevation of the upper portion of the instrument head as seen from the subject's side;

Figure 3 is a vertical sectional view on a somewhat enlarged scale, taken centrally through the instrument head, certain of the parts being shown in elevation;

Figure 4 is a view corresponding to Figure 2 on an enlarged scale, with portions of the instrument broken away and shown in section so as to more clearly show the details of the slides and the adjusting means therefor;

Figure 5 is a composite view showing the slides in elevation on an enlarged scale;

Figure 6 is a plan view of one of the slides of Figure 5 on an enlarged scale; and Figure 7 is a diagrammatic perspective view showing one typical use of the instrument in projecting shadow lines into the eye for the purpose of measuring or calibrating the retina vessels of the eye.

Like reference characters designate corresponding parts in the several figures of the drawings, wherein I denotes a lamp-supporting spindle having a coupling 2 fixed to its lower end for detachable connection with a conventional battery handle (not shown), or to some other suitable source of electrical energy, the details of which are immaterial to this invention. It will be understood, however, that when the instrument head shown in the drawings herein is connected by the coupling 2 to the battery handle, the battery handle serves as a means for manipulating the instrument during its use in examining or treating the subject under examination.

Attached to the spindle 1 is a frame generally designated 4, which includes a cylindrical or tubular part 5 which receives the spindle 1 to which the frame is removably attached by means of a set screw 6. At the front or observer's side of the tubular part 5, is an upright stationary plate 7 having a central annular boss 8 on which is rotatably mounted a main lens carrier or disc 9. A front cover plate 10 is removably attached to the frame 4 by means of a screw 11 threadedly received in the boss 8 of the frame plate 7.

The main lens carrier 9 is free to rotate on the boss 8 between the plates 7 and 10, and carries adjacent to its periphery a plurality of equally spaced lenses 12 which are selectively registrable with a sight opening 13 in the plate 7 and a corresponding sight opening 13' in the cover plate 10, near the upper end of the frame 4. The sight openings 13, 13' are coaxial with each other so that as the main lens carrier 9 is rotated about its central axis, the various lenses 12 carried thereby, and which are preferably of different dioptrics, are successively brought into register with the sight openings so that the observer may view the eye of the subject under examination through the sight openings and the interposed selected lens, as in the customary use of an ophthalmoscope.

Carried by the spindle 1 and disposed within the tubular portion 5 of the frame 4 is a small but powerful electric lamp 14 over which is positioned a ferrule 15 having mounted in its upper end a condenser lens 16. Disposed above the lamp 14 and adjustably mounted in a split bearing frame 17 fixed to the back of the frame plate 7, as best seen in Figure 4, is a prism 18 through which the light rays from the lamp 14 are projected. As the light rays pass through the prism, they are reflected by the reflecting surfaces thereof and emerge from the rear face 19 of the prism in a direction generally parallel to and just below the axis of the sight openings 13, 13', so that as the observer looks through the sight openings into the eye of the subject under examination, the eye will be illuminated clearly by the light rays.

The back of the frame plate 7, that is, at the side next to the subject under examination, is provided with an annular recess 20 in which there is seated an annular ring 21 which is free to rotate about its central axis. This ring 21 is enclosed in a cup-shaped housing generally designated 22, the front portion of which housing is formed integrally with the frame plate 7, and the back portion thereof being removably attached thereto by screws 23, 23, as best shown in Figure 4. The back wall 24 of the housing 22 is provided with an enlarged opening 25 which is of sufficient size and so located as to permit an unobstructed view therethrough through the sight openings 13, 13', previously described, when examining the subject. The housing 22 is also provided with an elongated slot 26 at its upper side through which extends a knob 27 which is fixed at its inner end to the ring 21 in any suitable manner, as by means of a screw 27'. By means of this knob 27, angularly shifting movement may be conveniently imparted to the ring 21.

It will be seen from reference to the drawings that the ring 21 encircles the prism 18, and the upper side of the ring is positioned above the sight openings 13, 13', whereas the lower side of the ring is interposed between the lamp 14 and the prism 18. The ring is provided at its lower side with a plurality of openings arranged in equally spaced relation to each other in the lower half of teh ring. Mounted in these respective openings is a series of light-modifying units which may have various controlling effects on the light rays. For example, one of these units 28 may be provided with a large aperture, another unit 29 may be provided with a small aperture or pin hole, another unit 30 may be provided with a narrow slit, another unti 31 may comprise a color filter, and a further unit 32 may comprise a light-diffusing element. The number of these units 28 to 32 inclusive, may be varied according to the requirements of the user, and may be supplemented by additional units, such as "Polariod" lenses, graticules, etc., if desired. By selectively adjusting the ring 21 rotatively with the aid of the knob 27, the units 28 to 32 may be selectively interposed in the light beam at a point between the lamp 14 and the prism 18 of the illuminating system, the effect of which is to selectively vary the concentration, size and shape or other characteristics of the light beam, which is finally projected rearwardly through the opening 25 and into the eye of the subject under examination. This regulation of the light beam may be availed of both in the use of the lenses 12 in the main lens disc 9, or independently thereof, as will now be more fully described.

In addition to the regulation of the light beam in the manner above referred to, it is also desirable at times to vary the angle of illumination. This variation of the angle of illumination can be simply and effectively produced by rotatively adjusting the prism 18. To this end, the prism is free to turn in the bearing 17, and the prism is preferably mounted in a tubular sleeve 33 which is provided adjacent its lower end with an aperture 34 in the back of the sleeve.

The rear wall of the housing 22 is provided on its outer face with a recess 35 in which is seated a slide bar 36 which is freely movable in the recess in an endwise direction. Carried by the slide bar 36 and extending inwardly therefrom is a pin 37 which projects into the opening 34 in the sleeve 33 in which the prism 18 is mounted.

Mounted on the rear wall 24 of the housing 22 is a disc member 40, the disc being rotatively connected to the wall at its center by a screw 41 extending through the disc and threadedly received in the wall 24. The disc 40 is preferably recessed at its forward side to provide an annular shoulder 42 which extends about the periphery of the housing 22 to aid in centralizing the disc on the housing. The outer margin of the disc 40 preferably extends somewhat beyond the outer margin of the housing 22, as at 43, in order that rotation may be readily imparted to the disc by the finger-tips of the operator's hand, this marginal edge of the disc being suitably knurled or serrated. The disc 40 is provided at its inner face with a radially extended recess 36' in which is received a circular pin or button 36'' carried by the slide bar 36 so that as rotation is imparted to the disc 40, it will serve to move the slide bar 36 endwise, and consequently a corresponding motion is imparted to the pin 37 which serves to angularly move the prism 18 about its central vertical axis. In order to indicate the amount of angular adjustment of the prism, the disc is preferably marked on its rear face near its lower edge with a suitable reference point such as the arrow head 40', and the lower side of the housing 22 is downwardly extended somewhat below the lower marginal edge of the disc so as to provide a surface on which suitable graduation marks 40'' can be marked for cooperation with the reference mark 40' on the disc. These graduation marks 40'' are preferably extended for a suitable distance to each side of the vertical axis of the instrument so as to indicate the degree of angular shifting movement of the prism in either direction over the normal range of adjustment of the prism.

In order to prevent the disc 40 from obstructing the light beam and the line of observation through the sight openings 13, 13', the disc is provided with an aperture 13'' registering with the opening 25 in the housing 22, and with the sight openings 13, 13'. Also, below the aperture 13'', the disc 40 is provided with an arcuate slot 45 of sufficient length to leave the opening in the back wall 24 of the housing 22 unobstructed throughout the range of rotative adjustment of the disc in opposite directions, when the light beam is projected from the prism rearwardly through the back of the instrument.

A change of the angle of illumination as afforded by the angular or rotative adjustment of the prism 18 may also be availed of to advantage in utilizing the instrument without making the observations through the sight openings 13, 13', and I have particular reference in this regard to examinations of the eye by the oblique method, where the light beam is thrown across the cornea from the temporal side to the nasal side in order to more effectively show up foreign bodies, ulcers, and scars. To aid in such examinations, the instrument is preferably provided with magnifying means which are preferably attached to the back of the instrument and selectively adjustable from an extended operative position to a retracted out-of-the-way position. As shown in the drawings, I preferably provide two separate magnifying means, one on each side of the instrument so that they can be selectively used with either eye of the observer. Each magnifying means includes a magnifying lens 46 mounted at the outer end of an arm or lens holder 47 which is pivotally secured at its inner end, as at 48, to the back of the frame plate 7, thus permitting the arm 47 and its lens 46 to be swung outwardly from a normally retracted position as shown at the left in Figure 2 of the drawings, to a laterally extended position as shown at the righthand side of this figure.

In order to facilitate movement of the lenses 46 and their supporting arms 47 from the retracted to the extended positions, and to protect the lenses when not in use, I preferably provide a guard or cover 49 for each lens having the form of a flat plate of a shape generally conforming to the outline of the arm or lens holder. The inner end of the guard overlies the inner end of the arm 47 at the pivot 48, so that the guard is free to swing in the same manner as the lens carrier. At an intermediate point along the inner edge of each guard, the guard is provided with a forwardly extended tongue 51 which is adapted to abut against the arm 47 of the lens carrier. Thus, when the guard 49 is swung outwardly to an extended position, the abutment tongue 51 engages the arm 47 of the lens carrier and simultaneously swings the magnifying lens to its operative extended position, or at least to a position sufficiently extended as to more readily enable the lens carrier to be manipulated by the user to the desired adjusted position for viewing the particular illuminated area under examination. When the magnifying lens carrier has been moved outwardly by means of the swinging movement of the guard 49, which in fact is a combination guard and actuator, the guard may be retracted independently of the lens carrier and magnifying lens, so that it will lie in an out-of-the way position behind the frame plate 7 of the instrument, as shown at the lefthand side of Figure 2. To restore the magnifying lens and the lens carrier to its normally out-of-the-way position, it is simply necessary to swing the same inwardly until it occupies the position shown at the lefthand side of Figure 2, behind the guard 49.

While the means for bending the light beam from the lamp has been shown and described as having the form of a prism designated 18, it will be understood that any other suitable light bending means may be employed in lieu thereof, as for example, a reflector or a pencil of quartz glass, or the like. Therefore, the term "prism" as used in the description and in the appended claims, should be considered in a broad sense as embracing any equivalent light bending means by which the beam of light from the lamp 14 may be bent through an angle of substantially 90°.

Likewise, where the magnifying means has been described and shown as having the form of a magnifying lens designated 46, it will be obvious that it is within the purview of my invention to employ a still more powerful magnifying system, such as a small telescope or the like.

The features of the instrument as specifically described above substantially conform to the disclosure in my co-pending application, Serial No. 581,752, filed March 9, 1945, as hereinbefore referred to. The construction of the instrument is in the nature of an ophthalmoscope head which is adapted to be attached to a battery handle or other suitable support by means of which the instrument may be conveniently manipulated in examining the eye. I now come to the features to which the present invention more particularly relate, as indicated at the commencement hereof.

As previously indicated, the lower portion of the housing 22 is downwardly extended at the back of the frame plate 7, said extension being designated 22'. Mounted in said extension 22' are two slides which are respectively designated 52 and 53, each of said slides preferably being in the form of substantially flat plates which are respectively provided at the central portions thereof with recesses in which a smaller plate of transparent material may be mounted as at 54. The recess 55 in each of the slides 52, 53 extends from one extreme marginal edge of the slide to a point just short of the opposite marginal edge, so that the transparent plate 54 may be slipped into place by moving it inwardly into the recess 55 from one edge of the slide. The transparent plates 54 may be made of glass or other transparent material, and each transparent plate is provided with a transversely extended mark preferably having the form of a line 56 suitably delineated on the transparent plate. In addition, each transparent plate may also be divided by suitable graduations 57, also having the form of lines delineated on the plate, which are arranged to intersect the line 56 at right angles thereto, if preferred.

At the end of one of the slides, for example, the lefthand end of the slide 52, the slide is provided with a toothed extension 58; and at the opposite end of the other slide, for example, the righthand end of the slide 53, the slide is also provided with a toothed extension 59. The two slides are thus capable of being superposed one upon the other, and are enclosed within the extension 22' at the bottom of the housing 22, as best shown in Figure 4 of the drawings. When mounted in the housing as shown in the drawings, the slides are disposed between the lamp 14 and the lower side of the ring 21 which carries the various light-modifying means designated 28 to 32 inclusive, and the slides are free to move relative to each other in an endwise direction. When the slides 52 and 53 are exactly in register with each other, the lines 56 on the respective transparent plates of the slides are also in register with each other, and as the slides are moved endwise relative to each other, the lines 56 will separate or move apart so that the distance between the lines will be proportional to the amount of relative movement between the respective slides.

In order to conveniently actuate the slides 52 and 53, to vary the position of the lines 56 relative to each other, the toothed extensions 58 and 59 of the respective slides are engaged with the upper toothed ends of the respective lever arms 60 and 61. The lever arms are in turn pivotally attached to the rear side of the frame plate 7 in any suitable manner, as by means of screws 62, 62. The lower ends of the respective lever arms 60 and 61 are also provided with teeth which are adapted to engage the respective worms 63 and 64 on a shaft 65 which extends transversely through the frame of the instrument, the shaft being journaled for rotation in the frame and projecting outwardly beyond the opposite sides of the frame in the form of control knobs 65, 66, which are conveniently accessible to the finger-tips of the user's hand. While the shaft 65 shown in the drawings is illustrated in the form of a single shaft which is capable of being rotated by either of the knobs 65, 66 so as to simultaneously actuate the lever arms 60, 61, and consequently simultaneously move the respective slides 52, 53, the shaft 65 may be split at the center so as to permit movement of either one or the other of the slides independently.

At the lower end of each of the lever arms 60, 61, the lever arms are extended forwardly and laterally inwardly as indicated at 67 and 68 respectively, and at the extreme ends of the extensions 67, 68, the extensions terminate in indicator pointers 69 and 70. The front cover plate 10 is slotted as at 71 so that the extension arms 67, 68 can project through the slot to dispose the pointers 69, 70 at the forward side of the front cover plate. The slot 71, while being shown in the drawings as a straight slot, is sufficiently large to accommodate the slight arcuate movement of the pointers 69, 70 as the adjustments are made of the slides 52, 53, by means of the actuator knobs 65, 66. The front cover plate 10 is graduated on the front face thereof, as indicated at 72, said graduations being arranged at intervals on opposite sides of the central axis of the instrument and progressively increasing in distance from the axis outwardly, with the graduations disposed for coaction with the pointers 69, 70.

The use of the instrument is illustrated diagrammatically in Figure 7 of the drawings, wherein it will be seen that when the lamp 14 is energized, the light rays from the lamp will be directed through the transparent portions of the slides 52, 53, after which the light beam passes through one of the selected light-modifying means carried by the ring 21, and then through the prism 18, from which the light beam is projected rearwardly into the eye which is diagrammatically represented at 73. The light beam, which is represented by the broken lines, is directed through the pupil at the front of the eye, and is then projected onto the retina, which causes shadow lines represented at 74 and 75 to be cast onto the retina by the projections of the lines 56 on the respective slides 52, 53. By suitably adjusting the slides so as to move the lines toward or away from each other, the shadow lines 74, 75 may be adjusted towards and away from each other in a corresponding manner so that the distance therebetween may be used as a measure of the size of the retina vessels or other parts or conditions of the eye which are to be measured or calibrated. When the instrument has been adjusted, the measurement is visually indicated by the pointers 69, 70 at the front of the instrument which are readily visible to the observer from the observer's side of the instrument. The measurements just referred to may be made with or without the aid of the lenses 12 of the lens carrier, or with or without the aid of the magnifying lenses 46, and while it is not absolutely essential to the use of the instrument for measuring purposes, to have the prism 18 angularly adjustable, such angular adjustments of the prism may be utilized to facilitate the direction of the beam of light onto the field of the eye which is to be examined.

While the specific details of construction have been herein shown and described, the invention is not confined thereto as changes and alterations may be made without departing from the spirit thereof as defined by the appended claims.

I claim:

1. An optical instrument for examining the eye, comprising a support, means carried by said support for directing a light beam into the eye of a subject while permitting observation of the illuminated field of the eye, and means for measuring the dimensions of certain characteristics of the eye within the illuminated field, said last-named means comprising means for projecting shadow lines into the eye by the light beam aforesaid, and means for adjusting the shadow line projecting means aforesaid for varying the spacing of said shadow lines relative to each other independently of the position of the instrument and in proportion to the measurement being made.

2. An optical instrument for examining the eye, comprising a support, an electric lamp carried by said support, reflector means mounted on said support for receiving light rays from said lamp and for directing the light rays in the form of a light beam into the eye of a subject, said support having a sight opening therethrough for permitting observation of the illuminated field of the eye, and adjustable means carried by said support and disposed in the path of the light rays for projecting a pair of parallel shadow lines into the eye, and means for adjusting the shadow line projecting means aforesaid for varying the spacing of said shadow lines relative to each other independently of the position of the instrument and in proportion to the measurement being made.

3. An optical instrument for examining the eye, comprising a support, an electric lamp carried by said support, reflector means mounted on said support for receiving light rays from said lamp and for directing the light rays in the form of a light beam into the eye of a subject, said support having a sight opening therethrough for permitting observation of the illuminated field of the eye, and means carried by said support and disposed in the path of the light rays for projecting a plurality of shadow lines into the eye, said last-named means comprising a pair of slides movably disposed in superposed relation to each other, each slide having a transparent area across which is delineated a reference line which is adapted to be projected by the light rays into the eye as a shadow line and means for adjusting said slides to vary the spacing of the shadow lines relative to each other independently of the position of the instrument and in proportion to the measurement being made.

4. An optical instrument for examining the eye, comprising a support, an electric lamp carried by said support, reflector means mounted on said support for receiving light rays from said lamp and for directing the light rays in the form of a light beam into the eye of a subject, said support having a sight opening therethrough for permitting observation of the illuminated field of the eye, and means carried by said support and disposed in the path of the light rays for projecting a plurality of shadow lines into the eye, said last-named means comprising a pair of slides movably disposed in superposed relation to each other, each slide having a transparent area across which is delineated a reference line which is adapted to be projected by the light rays into the eye as a shadow line.

5. An optical instrument for examining the eye, comprising a support, an electric lamp carried by said support, reflector means mounted on said support for receiving light rays from said lamp and for directing the light rays in the form of a light beam into the eye of a subject, said support having a sight opening therethrough for permitting observation of the illuminated field of the eye, and means carried by said support and disposed in the path of the light rays for projecting a plurality of shadow lines into the eye, said last-named means comprising a pair of slides movably disposed in superposed relation to each other, each slide having a transparent area across which is delineated a reference line which is adapted to be projected by the light rays into the eye as a shadow line, and means for adjustably moving said slides relative to each other in a direction normal to the reference lines for varying the spacing of the reference lines and consequently the projected shadow lines.

6. An optical instrument for examining the eye, comprising a support, an electric lamp carried by said support, reflector means mounted on said support for receiving light rays from said lamp and for directing the light rays in the form of a light beam into the eye of a subject, said support having a sight opening therethrough for permitting observation of the illuminated field of the eye, and means carried by said support and disposed in the path of the light rays for projecting a plurality of shadow lines into the eye, said last-named means comprising a pair of slides movably disposed in superposed relation to each other, each slide having a transparent area across which is delineated a reference line which is adapted to be projected by the light rays into the eye as a shadow line, and means for adjustably moving said slides relative to each other in a direction normal to the reference lines for varying the spacing of the reference lines and consequently the projected shadow lines, said latter means including worm and rack means operatively connected to the respective slides.

7. An optical instrument for examining the eye, comprising a support, an electric lamp carried by said support, reflector means mounted on said support for receiving light rays from said lamp and for directing the light rays in the form of a light beam into the eye of a subject, said support having a sight opening therethrough for permitting observation of the illuminated field of the eye, and means carried by said support and disposed in the path of the light rays for projecting a plurality of shadow lines into the eye, said last-named means comprising a pair of slides movably disposed in superposed relation to each other, each slide having a transparent area across which is delineated a reference line which is adapted to be projected by the light rays into the eye as a shadow line, means for adjustably moving said slides relative to each other in a direction normal to the reference lines for varying the spacing of the reference lines and consequently the projected shadow lines, and indicator means operable responsive to adjustment of the slides for visibly indicating the relative spacing of the shadow lines.

8. An optical instrument for examining the eye, comprising a support, an electric lamp carried by said support, reflector means mounted on said support for receiving light rays from said lamp and for directing the light rays in the form of a light beam into the eye of a subject, said support having a sight opening therethrough for permitting observation of the illuminated field of the eye, and means carried by said support and disposed in the path of the light rays for projecting a plurality of shadow lines into the eye, said last-named means comprising a pair of slides movably disposed in superposed relation to each other, each slide having a transparent area across which is delineated a reference line which is adapted to be projected by the light rays into the eye as a shadow line, means for adjustably moving said slides relative to each other in a direction normal to the reference lines for varying the spacing of the reference lines and consequently the projected shadow lines, indicator means operable responsive to adjustment of the slides for visibly indicating the relative spacing of the shadow lines, said indicator means including an indicator pointer operatively connected to each slide and cooperative with a graduated scale on the support.

9. An optical instrument for examining the eye, comprising a support, an electric lamp carried by said support, reflector means mounted on said support for receiving light rays from said lamp and for directing the light rays in the form of a light beam into the eye of a subject, said support having a sight opening therethrough for permitting observation of the illuminated field of the eye, and means carried by said support and disposed in the path of the light rays for projecting a plurality of shadow lines into the eye, said last-named means comprising a pair of slides interposed between the lamp and the reflector means and movably disposed in superposed relation to each other, each slide having a transparent area across which is delineated a reference line which is adapted to be projected by the light rays into the eye as a shadow line, and means for adjusting the slides to vary the spacing of the shadow lines relative to each other independently of the position of the instrument and in proportion to the measurement being made.

10. An optical instrument for examining the eye, comprising a support, an electric lamp carried by said support, reflector means mounted on said support for receiving light rays from said lamp and for directing the light rays in the form of a light beam into the eye of a subject, said support having a sight opening therethrough for permitting observation of the illuminated field of the eye, and means carried by said support and disposed in the path of the light rays for projecting a plurality of shadow lines into the eye, said last-named means comprising a pair of slides disposed in superposed relation to each other, each slide having a transparent area across which is delineated a reference line which is adapted to be projected by the light rays into the eye as a shadow line, said reflector means being angularly adjustable for varying the angle of illumination of the eye, means for angularly adjusting said reflector means, and indicator mean for visibly indicating the degree of adjustment.

WILLIAM N. ALLYN.

REFERENCES CITED

The following references are of record in the file of this patent:

UNITED STATES PATENTS

| Number | Name | Date |
|---|---|---|
| 787,083 | DeZeng | Apr. 11, 1905 |
| 1,851,173 | Hall | Mar. 29, 1932 |
| 1,889,456 | Tillyer | Nov. 29, 1932 |
| 2,273,876 | Lutz et al. | Feb. 24, 1942 |
| 2,384,098 | Klemperer | Sept. 4, 1945 |

FOREIGN PATENTS

| Number | Country | Date |
|---|---|---|
| 482,262 | Great Britain | Mar. 24, 1938 |

OTHER REFERENCES

Duke-Elder, Text book of Ophthalmology, vol. II, Pub. C. V. Mosby Company, St. Louis, Mo. (First printed in 1937—reprinted in 1946—pages 1178, 1179 of 1946 reprint.)